United States Patent
Nahum et al.

(10) Patent No.: US 11,215,838 B2
(45) Date of Patent: Jan. 4, 2022

(54) HELICOPTER HEAD-MOUNTED SEE-THROUGH DISPLAYS

(71) Applicant: ELBIT SYSTEMS LTD., Haifa (IL)

(72) Inventors: Tomer Nahum, Haifa (IL); Gili Sarna, Haifa (IL)

(73) Assignee: Elbit Systems Ltd., Haifa (IL)

(*) Notice: Subject to any disclaimer, the term of this patent is extended or adjusted under 35 U.S.C. 154(b) by 0 days.

(21) Appl. No.: 16/605,810

(22) PCT Filed: Apr. 16, 2018

(86) PCT No.: PCT/IL2018/050430
§ 371 (c)(1),
(2) Date: Oct. 17, 2019

(87) PCT Pub. No.: WO2018/193447
PCT Pub. Date: Oct. 25, 2018

(65) Prior Publication Data
US 2020/0050003 A1 Feb. 13, 2020

(30) Foreign Application Priority Data
Apr. 20, 2017 (IL) .......................................... 251843

(51) Int. Cl.
| | |
|---|---|
| *G02B 27/01* | (2006.01) |
| *G01C 23/00* | (2006.01) |
| *G01C 15/14* | (2006.01) |

(52) U.S. Cl.
CPC ......... *G02B 27/0179* (2013.01); *G01C 15/14* (2013.01); *G01C 23/00* (2013.01); *G02B 27/017* (2013.01); *G02B 2027/0187* (2013.01)

(58) Field of Classification Search
CPC .............. G02B 27/0179; G02B 27/017; G02B 2027/0187; G02B 2027/0181;
(Continued)

(56) References Cited

U.S. PATENT DOCUMENTS

| | | | | |
|---|---|---|---|---|
| 3,668,622 A | * | 6/1972 | Gannett | G01C 23/005 340/953 |
| 5,072,218 A | * | 12/1991 | Spero | G02B 27/017 340/980 |

(Continued)

FOREIGN PATENT DOCUMENTS

| | | |
|---|---|---|
| FR | 3016448 | 7/2015 |
| JP | 3252129 | 1/2002 |

OTHER PUBLICATIONS

International Search Report for PCT Application No. PCT/IL2018/050430, dated Aug. 14, 2018.

(Continued)

*Primary Examiner* — Brian Wilson
(74) *Attorney, Agent, or Firm* — Pearl Cohen Zedek Latzer Baratz LLP (57) ABSTRACT

Head-mounted see-through displays and methods are provided which improve helicopter displays and provide more relevant information to the pilot while reducing the information load on the display. Displays comprise a peripheral pilot-scene pitch indication region, indicating scene orientation information according to an orientation of the pilot's head with respect to the scene, a propulsion state indication region, indicating rotor and engines states with respect to their nominal operation states by presenting only deviations of the rotor and engines states from their nominal operation states, a speed indication region, indicating, in association with displayed air speed, a calculated ground speed or a calculated ground speed component in a direction of propagation and a helicopter pitch indication region displaying a pitch ladder which is re-arranged to space close pitch lines and crowd remote pitch lines.

18 Claims, 10 Drawing Sheets

(58) Field of Classification Search
CPC ........ G02B 27/0172; G02B 2027/0141; G01C 9/005; G01C 15/14; G01C 23/00; G01C 23/005; G09B 9/46
USPC .................................................. 340/945–983
See application file for complete search history.

(56) References Cited

U.S. PATENT DOCUMENTS

| | | | | |
|---|---|---|---|---|
| 5,296,854 | A * | 3/1994 | Hamilton | G02B 27/01 340/973 |
| 5,337,048 | A | 8/1994 | Penwill | |
| 6,150,960 | A * | 11/2000 | Voulgaris | G01C 23/005 340/975 |
| 2009/0121901 | A1 * | 5/2009 | Namier | G08G 5/0021 340/975 |
| 2009/0138142 | A1 | 5/2009 | Still | |
| 2009/0284552 | A1 * | 11/2009 | Larson | G06F 3/012 345/632 |
| 2010/0235019 | A1 * | 9/2010 | De Bono | G01C 23/005 701/14 |
| 2012/0140070 | A1 | 6/2012 | De Mers et al. | |
| 2016/0117853 | A1 | 4/2016 | Zhong et al. | |
| 2016/0167672 | A1 * | 6/2016 | Krueger | A61B 5/4863 340/576 |
| 2016/0209233 | A1 * | 7/2016 | Harvey | G01C 23/005 |

OTHER PUBLICATIONS

Extended European Search Report for EP Patent Application No. 18787291.6, dated Dec. 23, 2020.
Webster J A: "Extreme wide field-of-view displays and the enclosed cockpit", Oct. 14, 1991; Oct. 14, 1991-Oct. 17, 1991; Oct. 14, 1991; pp. 399-404.

* cited by examiner

HELICOPTER HEAD-MOUNTED SEE-THROUGH DISPLAYS

CROSS-REFERENCE TO RELATED APPLICATIONS

This application is a National Phase Application of PCT International Application No. PCT/IL2018/050430, International Filing Date Apr. 16, 2018, entitled: "HELICOPTER HEAD-MOUNTED SEE-THROUGH DISPLAYS", published on Oct. 25, 2018, under publication No. WO 2018/193447, which claims the priority of Israel Patent Application No. 251843, filed on Apr. 20, 2017, which is hereby incorporated by reference in its entirety.

BACKGROUND OF THE INVENTION

I. Technical Field

The present invention relates to the field of helicopter displays, and more particularly, to head-mounted see-through displays.

2. Discussion of Related Art

Helicopter displays are used to provide data and information to the pilot concerning the helicopter machinery, instruments and concerning the surroundings.

U.S. Patent Publication No.: 2012140070A1 discloses a near-to-eye (NTE) display that allows an operator of an apparatus, such as a pilot of an aircraft, to see a conformal video presentation of the view outside the apparatus. Significant objects outside are converted into a conformal video view. An accelerator measures movement and rate of movement of the NTE display positioned on the operator's head, and if the movement and rate exceed a threshold, either ceases the continued display, removes, or deemphasizes the conformal image, for the period of the delay in order to eliminate any jerky or jittery motion of the displayed conformal image, which may be distracting, irritating, or headache inducing to the pilot.

French Patent Publication No.: 3016448 discloses a system that includes a viewing surface that is at least partially transparent to allow viewing through the viewing surface, of an environment outside the aircraft, and a set of display management on the viewing surface, comprising a module for generating and displaying on the viewing surface, information representing aircraft flight parameters on a first region at least partially transparent to the viewing surface. The set of display management includes a display module in a determined operational condition of the aircraft, at least one pop-up window on a second region of the viewing surface, the pop-up window being more opaque than the first region, the set of display management comprising a generating module information specific to the determined operational state, to be displayed on the popup window.

U.S. Patent Publication No.: US2009284552 discloses methods and systems for operating an avionics system. A predefined set of movements of a headset is detected. In response to the detection of the set of movements, one or more various functions are performed.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a head-mounted see-through display comprising a peripheral pilot-scene pitch indication region, wherein a processing unit associated with the display is configured to indicate scene orientation information according to an orientation of the pilot's head with respect to the scene.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein are for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units may be at least partially implemented by a computer processor.

Head-mounted see-through displays and methods are provided which improve helicopter displays and provide more relevant information to the pilot while reducing the information load on the display. Displays comprise a peripheral pilot-scene pitch indication region, indicating scene orientation information according to an orientation of the pilot's head with respect to the scene, a propulsion state indication region, indicating rotor and engines states with respect to their nominal operation states by presenting only deviations of the rotor and engines states from their nominal operation states, a speed indication region, indicating, in association with displayed air speed, a calculated ground speed or a calculated ground speed component in a direction of propagation and a helicopter pitch indication region displaying a pitch ladder (collection of pitch reference lines) which is re-arranged to space pitch lines which are close to an actual helicopter pitch and to crowd pitch lines which are remote from the actual helicopter pitch.

Figure 1A:
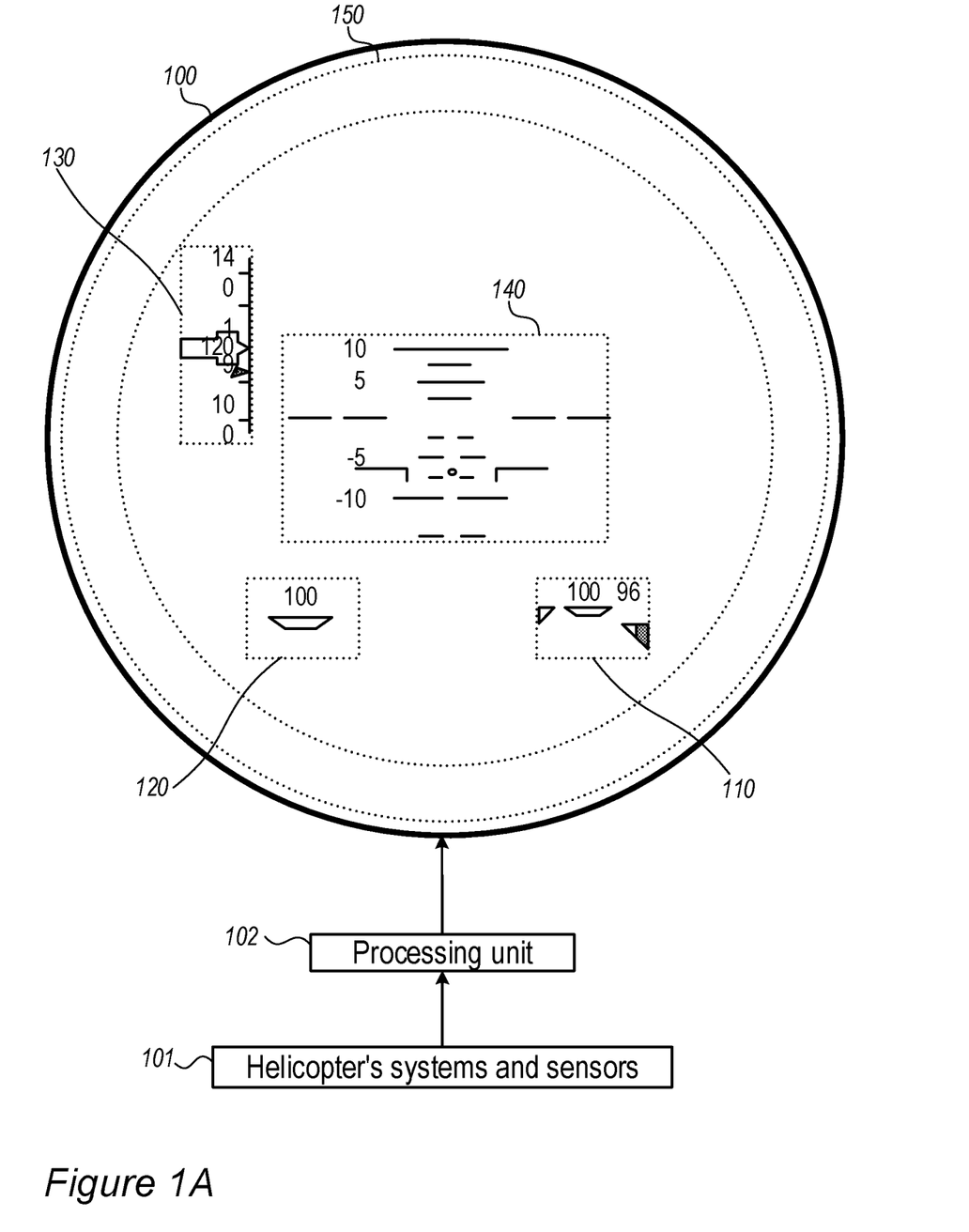
FIG. 1A is a high level schematic illustration of a see-through display, according to some embodiments of the invention.

FIG. 1A is a high level schematic illustration of a see-through display 100, according to some embodiments of the invention. See-through display 100 provide efficient and economic use of display space to simplify the information delivery to the helicopter pilot, which is applicable to and advantageous for prior art head down displays as well as for disclosed see-through and head up displays. FIG. 1A illustrates schematically some of the display regions of see-through display 100 which are disclosed in more detail below, and may include additional display regions, designed according to similar principles. The exemplified regions include a propulsion state indication region 110, a power state indication region 120, a speed indication region 130, a helicopter pitch indication region 140 and a peripheral pilot-scene pitch indication region 150, which are disclosed in more detail below.

See-through display 100 may comprise a processing unit 102 configured to receive information from the helicopter's systems and sensors 101 and display the received information on see-through display 100. Certain embodiments comprise a computer program product comprising a non-transitory computer readable storage medium having computer readable program embodied therewith, the computer readable program configured to implement peripheral pilot-scene pitch indication region 150, in head-mounted see-through display 100 and optionally implement any of display regions 110, 120, 130 and 140 which are disclosed below. It is explicitly noted that see-through display 100 may comprise any of display regions 110, 120, 130 and 140 and any of their combinations, as well as additional display regions presenting additional data, which may be configured according to the disclosed principles to minimize the visual load on the pilot.

Figure 1B:
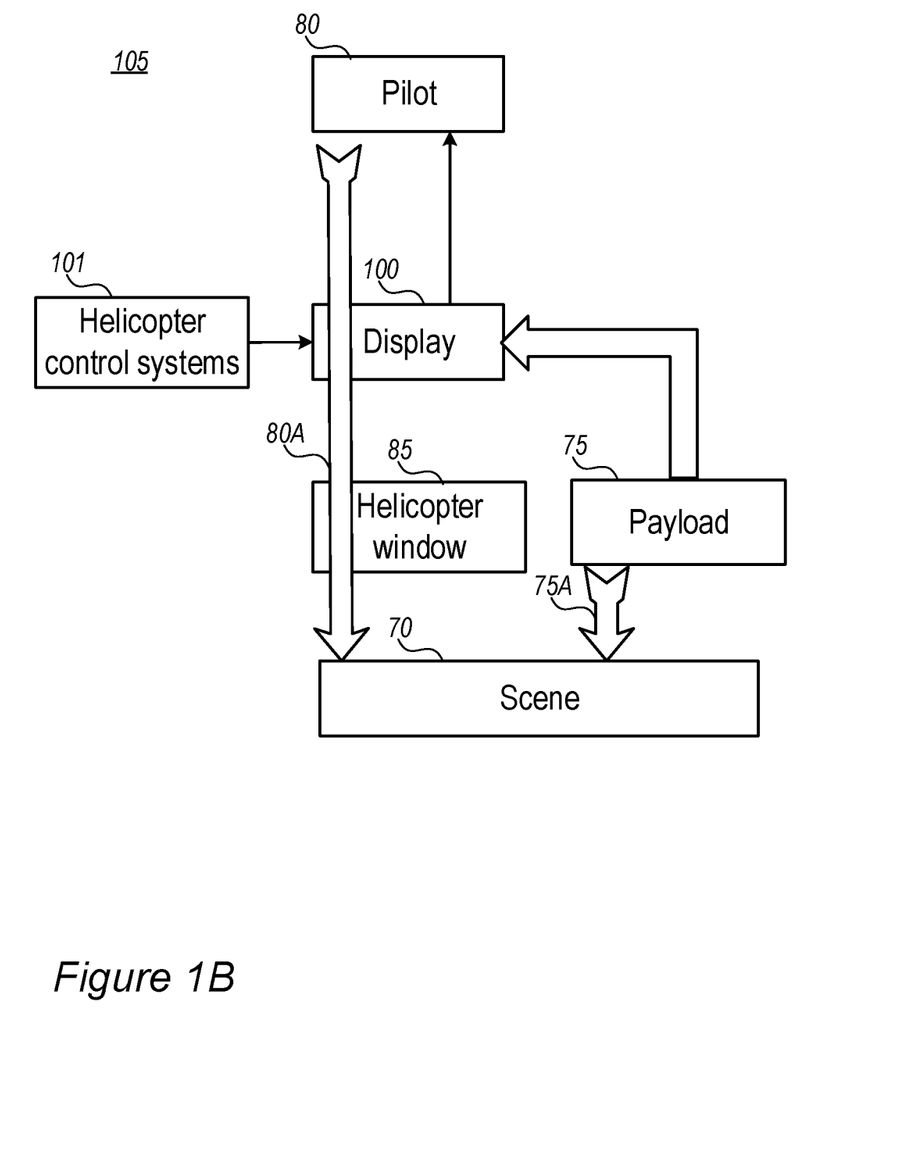
FIG. 1B is a high level schematic illustration of a display system, according to some embodiments of the invention.

FIG. 1B is a high level schematic illustration of a display system 105, according to some embodiments of the invention. In certain embodiments, see-through display 100 may be head-mounted and display information and data to a pilot of the helicopter. In certain embodiments, see-through display 100 may be associated with a payload such as an imaging unit and be configured to display information and data to the payload. In certain embodiments, see-through display 100 may be operable with respect to either (i) a pilot view orientation 80A, namely the line of sight of a pilot 80 to the helicopter window 85 onto a scene 70 and/or (ii) a payload view orientation 75A, namely the line of sight of a payload 75 onto scene 70, presented on display 100. Display system 105 may therefore combine direct, see-through, display of information and indirect, payload-mediated, display of information. Such configurations may be implemented for all see-through displays 100 disclosed herein, which may therefore be referred to as displays 100 (not necessarily having direct see-through operation with respect to pilot 80, but possibly with respect to payload 75). In certain embodiments, see-through display 100 may be switchable to display payload view orientation 75A in addition to a pilot view orientation 80A.

Figures 2A, 2B:
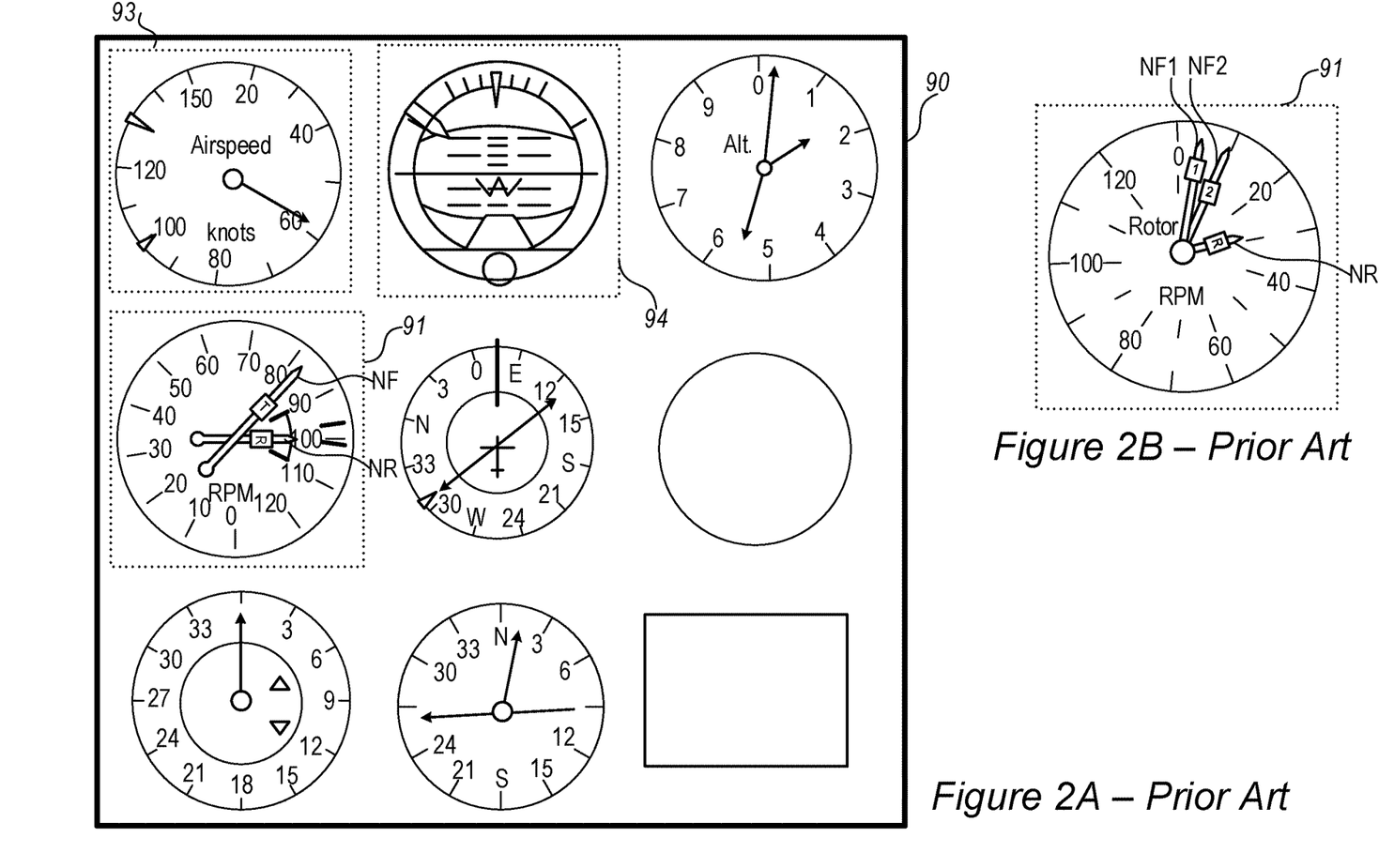
FIGS. 2A-2D are schematic illustrations of prior art displays.
Figure 2C:
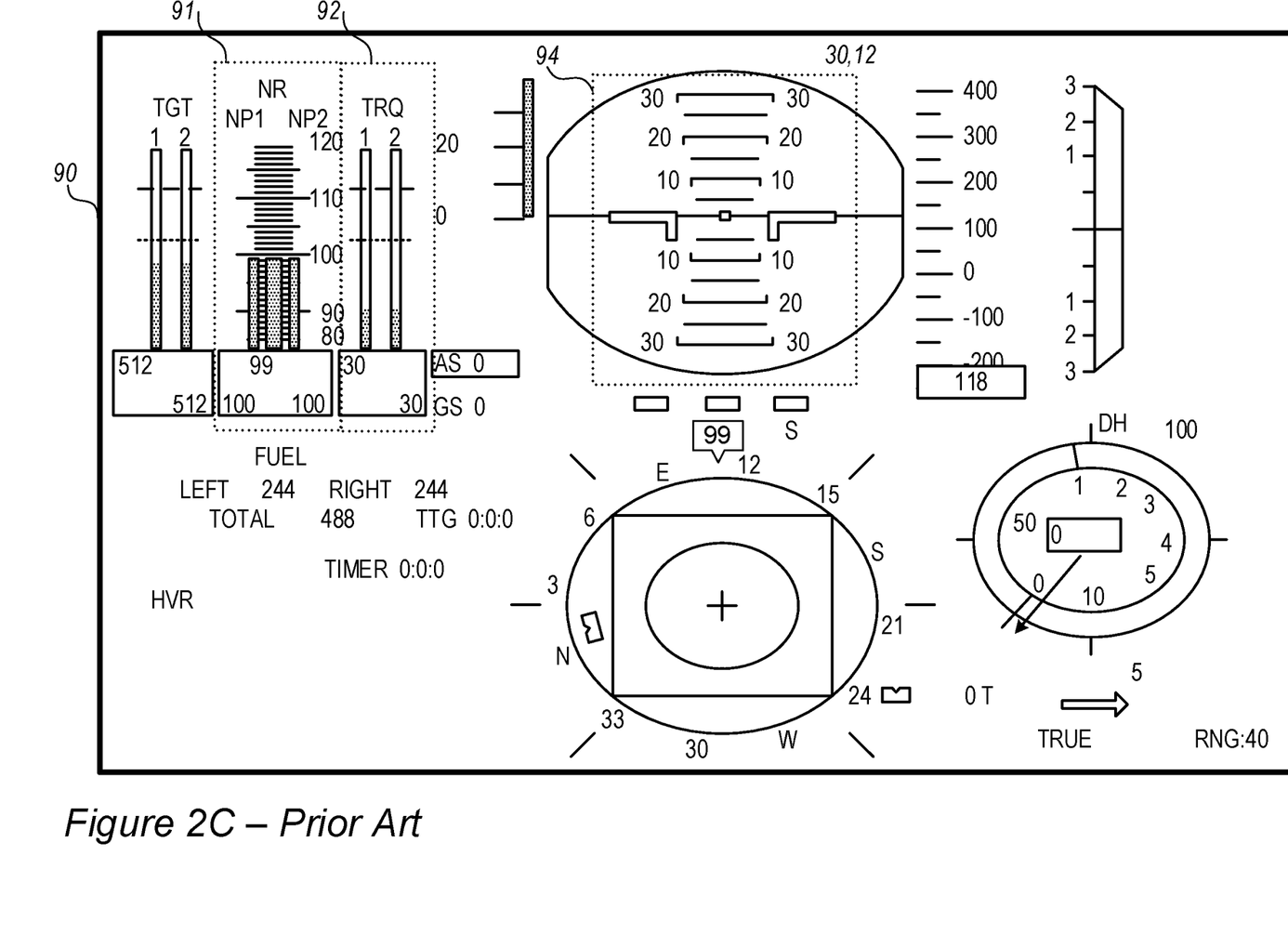
Figure 2D:
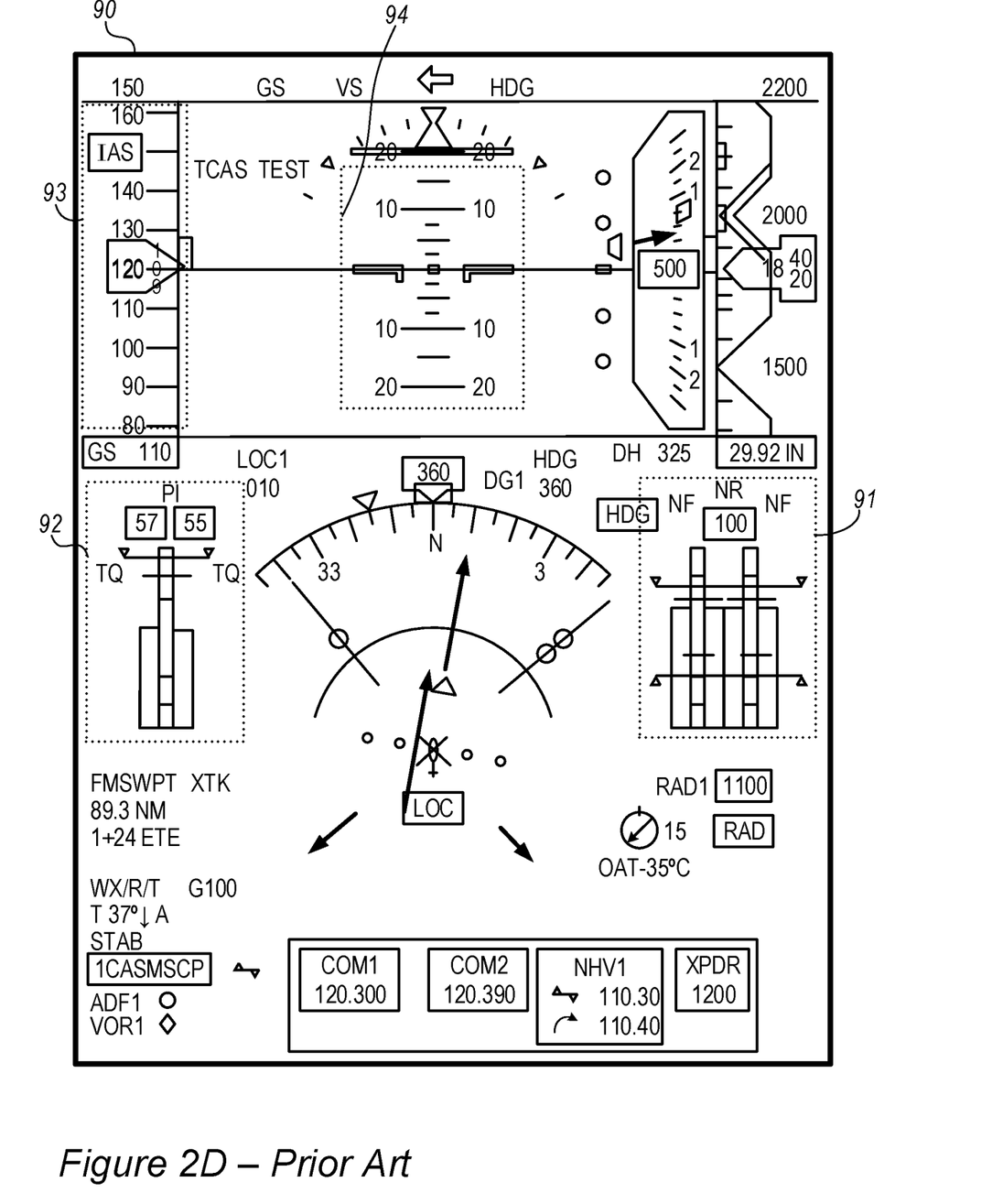

FIGS. 2A-2D are schematic illustrations of prior art displays. FIG. 2A is a schematic illustration of a part of an indicators panel 90 with analog mechanical indicators having a RPM (revolutions per minute) indicator 91, airspeed indicator 93 and a pitch indicator 94, which are used, together with other indicators (only some shown) to monitor and fly the aircraft. Specifically RPM indicator 91 has two dials—one denoted "T" and indicating the state of the turbine engine (as NF—the percentage of rotation speed of the power turbine) and another one denoted "R" and indicating the state of the rotor (as NR—the percentage of rotation speed of the rotor). FIG. 2B is a schematic illustration of a mechanical analog RPM indicator 91 with dials denoted "1" and "2" indicating the states of two turbine engines ($NF_1$, $NF_2$) and a dial denoted "R" indicating the state of the rotor. FIG. 2C is a schematic illustration of a digital indicators display 90 with RPM indicator 91, a torque (equivalent to PI—power index) indicator 92 and pitch indicator 94. All these prior art panels and display require a large area to display turbine and rotor states, power state, airspeed and pitch. FIG. 2D is a schematic illustration of a helicopter down display 90 according to the prior art, with display regions 91, 92, 93 and 94 indicating RPM, PI, airspeed and pitch, respectively.

Display regions 91, 92, 93 and 94 are analogous to disclosed regions 110, 120, 130 and 140, respectively with respect to the type of provided information concerning the helicopter, yet prior art display regions 91, 92, 93 and 94 take a much larger space of down display 90 and provide less information and in particular have a smaller information content for pilot use than disclosed display regions 110, 120, 130 and 140, respectively, as explained below in detail.

It is emphasized that prior art area limitations present a tradeoff between (i) the usability of prior art see-through displays (due to clutter) and (ii) the presentation of critical information on prior art see-through displays. This tradeoff in the prior art necessarily results in prior art see-through displays which are lacking in either or both of aspects (i) and (ii). In particular, various rules and regulations (e.g., 14 CFR 29.1305—Powerplant instruments; Federal Aviation Administration (FAA), Circular advisory concerning electronic flight displays, point 4.3—Effects of display failure conditions) require presentation of the data presented by prior art see-through displays 90 for crucial safety reasons, and seemingly necessitate a high level of clutter in see-through displays. Moreover, many studies show the critical necessity of data availability to the pilot, both the in the sense that clutter is detrimental and in the sense that all important information has to be displayed and may assist in solving critical situations, for example, see "Simulator-based study of emergencies yields insights into pilots' reaction times" by the Flight safety foundation—Helicopter safety, March-April 1999 as well as FAA regulations (Helicopter flying handbook, chapter 11—Helicopter Emergencies and Hazards) indicating the importance of quick understanding of the situation in various failure situations to the correct handling of the situation. It is emphasized that prior art see-through displays 90 which display only part of the required information to avoid clutter, require the pilot to check other indicators and displays which are not part of prior art see-through displays 90 during emergencies, an action with increases the pilot's reaction time to these emergencies and therefore reduces flight safety.

Advantageously, disclosed see-through displays 100 resolve the long-existing dilemma in the prior art and provide, for the first time, see-through displays 100 which are not cluttered and presented all critical information to the pilot and even some information which is not presented at all in prior art displays 90, as disclosed herein in detail. Therefore, disclosed see-through displays 100 enhance flight safety significantly with respect to prior art see-through displays.

Advantageously, disclosed see-through displays 100 solve the long standing problem of providing required pilot information in a see-through display while avoiding clutter and maintaining the usability and sufficiency of the display to solve flight emergencies. Moreover, disclosed see-through displays 100 may be configured to enhance deviations from normal operation and allow the pilot to solve related problems before they become emergencies, thereby further enhancing the flight safety. For example, layered display logic presented below, e.g., increase of the amount of details in relation to the extent of deviation from normal operation, is an approach which is implemented in disclosed see-through displays 100 and enhances information availability to the pilot during malfunctions without causing clutter during normal operation.

Figure 3A:
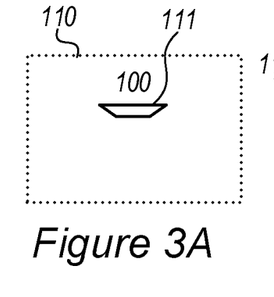
FIGS. 3A-3C are high level schematic illustrations of propulsion state indication region, according to some embodiments of the invention.
Figures 3B, 3C:
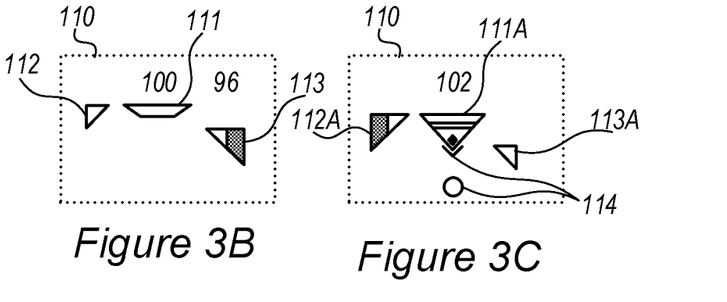

FIGS. 3A-3C are high level schematic illustrations of propulsion state indication region 110, according to some embodiments of the invention. Propulsion state indication region 110 may be implemented, e.g., by processing unit 102 on any type of display, such as see-through display 100, head up displays and/or head down displays. Processing unit 102 may be configured to indicate rotor and engines states with respect to their nominal operation states by presenting only deviations of the rotor and engines states from their nominal operation states. Processing unit 102 may be configured to indicate normal rotor and engines states by a designated symbol. Processing unit 102 may be further configured to grade the presentation according to a severity of malfunction of the rotor and engines. In certain embodiments, the severity of malfunction may be graded and correspondingly indicated, e.g., into type(s) requiring immediate pilot reaction and type(s) which do not require immediate control input from the pilot.

Instead of prior art display region 91 which indicates separately and continuously the state (in different colors) of both engines (indicated in FIG. 2 as NF—the percentage of rotation speed of the power turbines, or engines, in RPM—revolutions per minute) as well as the state of the rotor (indicated in FIG. 2 as NR—the percentage of rotation speed of the rotor, in RPM), propulsion state indication region 110 is configured to provide an indication 111 for regular operation of the engines and the rotor in single indication 111 (the number "100" denoting 100% NR), as illustrated schematically in FIG. 3A; separate indications 112, 113 for the states of the engines which may provide information concerning deviations or abnormalities of engine operation—e.g., form, size, colors in indications 112, 113 may be configured to indicate various deviations, possibly augmented by numeral indications such as the number "96" denoting 96% NF of the right engine, as illustrated schematically in FIG. 3B; and separate indications 111A, 112A and/or 113A for critical states of the rotor and/or engines which may provide information concerning excessive deviations or abnormalities of rotor and/or engine operation—e.g., form, size, colors in indications 111A, 112A and/or 113A may be configured to indicate different deviations, possibly augmented by numeral indications such as the number "102" denoting 102% NR, as illustrated schematically in FIG. 3C. In certain embodiments, additional flight indicators 114 may be displayed to indicate flight instructions relating to the excessive deviations or abnormalities of rotor and/or engine operation—e.g., in FIG. 3C, indication of the direction to which the NR should be changed.

In certain embodiments, indication 111 may be configured to indicate nominal conditions, e.g., within a set of given thresholds. Indications 112, 113 may be configured to indicate abnormal NF (e.g., as NF triangles) such as engine operating beyond a given threshold, and become visible only once the threshold is passed. Possibly only one of indications 112, 113 may be displayed, according to the identity of the engine with abnormal NF. Indications 111A, 112A and/or 113A may be configured to indicate abnormal NR such as the rotor operating beyond a given threshold, which may be accompanied by showing the threshold and flight indications 114 in addition to indicator 111A itself. The various indications types may be configured to provide only relevant information to the pilot, allowing the pilot to fully monitor the system and when needed to use indication 114 to guide flight, while using a minimal or very small region of the display. Disclosed propulsion state indication region 110 is configured to provide only specific relevant information and only when it is relevant, to spare display space and enable the pilot to focus on the information content.

Figure 4:
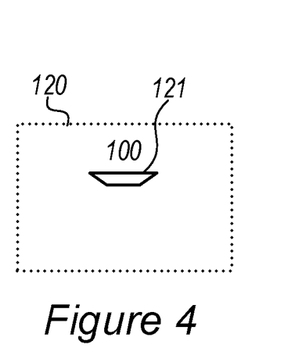
FIG. 4 is a high level schematic illustration of power state indication region, according to some embodiments of the invention.

FIG. 4 is a high level schematic illustration of power state indication region 120, according to some embodiments of the invention. Power state indication region 120 may be implemented, e.g., by processing unit 102 on any type of display, such as see-through display 100, head up displays and/or head down displays.

Instead of prior art display region 92 which indicates separately and continuously the power index (PI), in different colors, power state indication region 120 is configured to provide an indication 121 for regular operation, when all power values are in nominal conditions or within given thresholds, an indication when an engine is in a more limited situation (out of threshold for example), and a third indication when an engine is in an abnormal situation (for example out of limit). Further examples are provided in FIGS. 8D-8K. Disclosed power state indication region 120 is configured to provide only specific relevant information and only when it is relevant, to spare display space and enable the pilot to focus on the information content.

Figure 5:
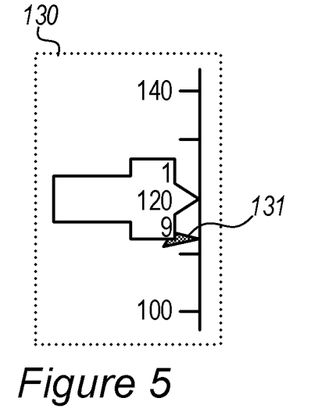
FIG. 5 is a high level schematic illustration of speed indication region, according to some embodiments of the invention.

FIG. 5 is a high level schematic illustration of speed indication region 130, according to some embodiments of the invention. Speed indication region 130 may be implemented, e.g., by processing unit 102 on any type of display, such as see-through display 100, head up displays and/or head down displays. Processing unit 102 may be further configured to indicate, in association with displayed air speed, a calculated ground speed or a calculated ground speed component in a direction of propagation.

In addition to prior art display region 93 which indicates the helicopter's air speed (indicated as 120 in the illustration), speed indication region 130 further comprises an indication 131 of the ground speed, or of a component of the ground speed in the direction of propagation (flight) of the helicopter. Indication 131, a ground speed (GS) bug, may be presented on the same scale as the air speed, and their proximity directly provides the pilot information about the difference between air and ground speeds. The relative indication also aids pilot comprehension of the wind situation (e.g., tail wind or nose wind) better than prior art display regions 93 which show the ground speed separately from the air speed (not illustrated in FIG. 2). Additional indication of the track angle with respect to the heading direction may be provided, to complete the sped indication and provide the pilot with a full comprehension of the airborne vehicle movement, both relative to the air mass and to the ground.

Figure 6A:
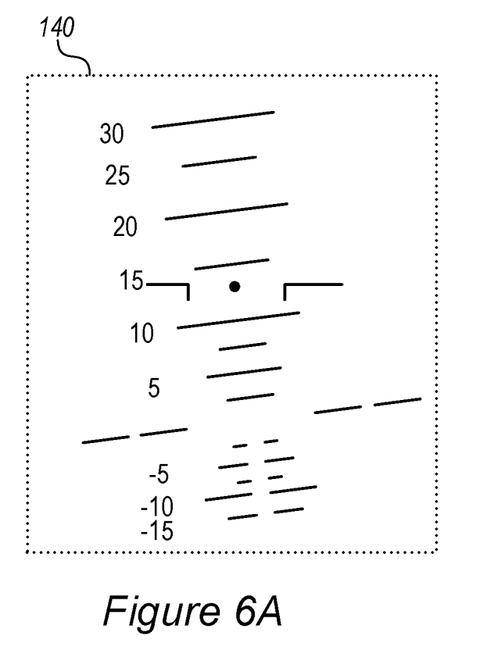
FIGS. 6A and 6B are high level schematic illustrations of helicopter pitch indication region, according to some embodiments of the invention.
Figure 6B:
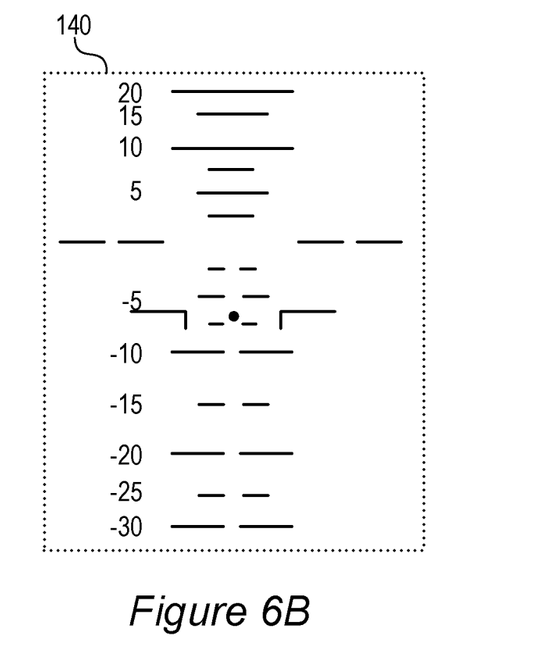

FIGS. 6A and 6B are high level schematic illustrations of helicopter pitch indication region 140, according to some embodiments of the invention. Helicopter pitch indication region 140 may be implemented, e.g., by processing unit 102 on any type of display, such as see-through display 100, head up displays and/or head down displays. See-through display 100 may be configured to display a pitch ladder (a collection of pitch reference lines) which is re-arranged to space pitch lines which are close to an actual helicopter pitch and to crowd pitch lines which are remote from the actual helicopter pitch, such as a cylindrical projection of the pitch ladder or any other geometrical projection, which may be adjustable by the user.

Instead of prior art display region 94 which indicates an evenly spaced pitch ladder, with equal distances representing equal pitch steps (as illustrated in FIG. 2), helicopter pitch indication region 140 is configured to adjustably compress pitch steps which are further away from current pitch values and adjustably expand pitch steps around current pitch values, as illustrated schematically in FIG. 6A for pitch values around 13° with helicopter inclination and in FIG. 6B for pitch values around −7° with vertical helicopter position (pitch values indicated by the black dots). For example, the pitch ladder may be displayed in helicopter pitch indication region 140 in cylindrical projection, as if drawn over a horizontal cylinder to provide a spacing between pitch reference lines having a high resolution over the center of the symbol while still allowing to see a large span of the pitch reference lines in the same display area, relative to linear scales. In embodiments of helicopter pitch indication region 140, both higher resolution around the current pitch value and a broader overall range of pitch values (due to compression of the scale away from the current pitch value) may be displayed in a similar or even smaller area of the display, according to the selected parameters of compression and expansion and/or parameters of the selected projection.

Figure 7A:
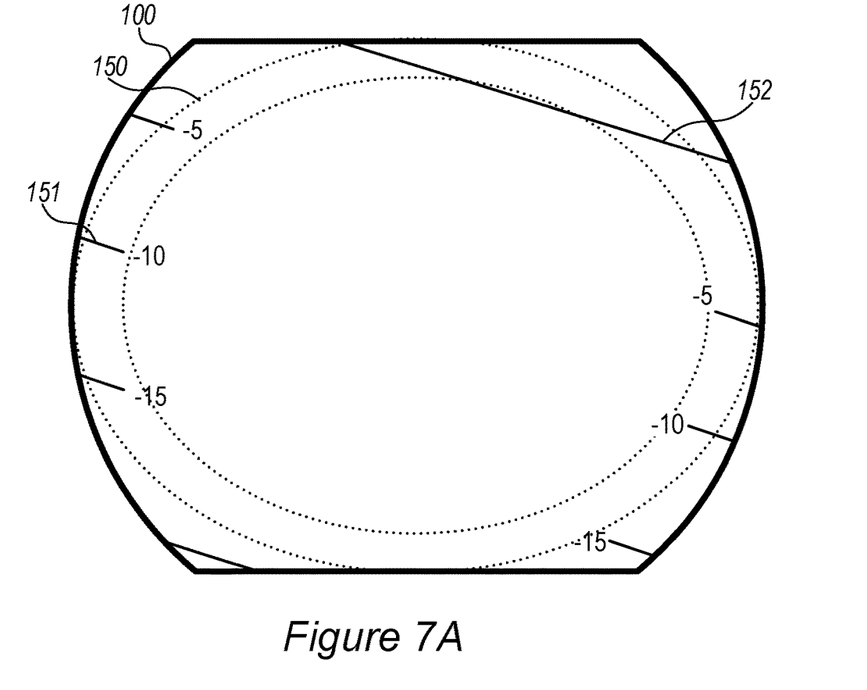
FIGS. 7A-7D are high level schematic illustrations of peripheral pilot-scene pitch indication region, according to some embodiments of the invention.
Figure 7B:
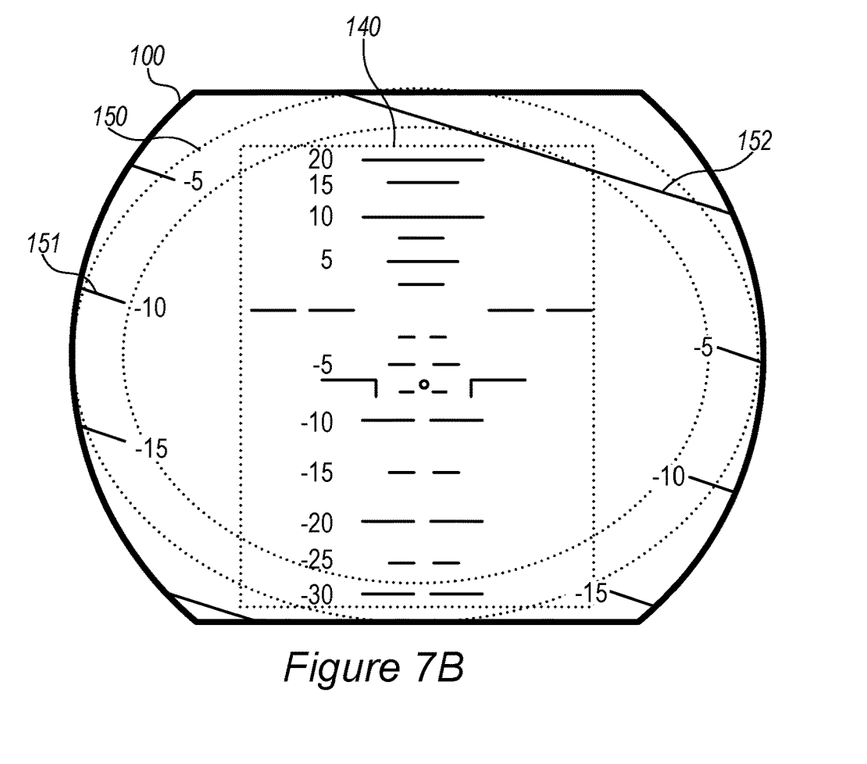
Figure 7C:
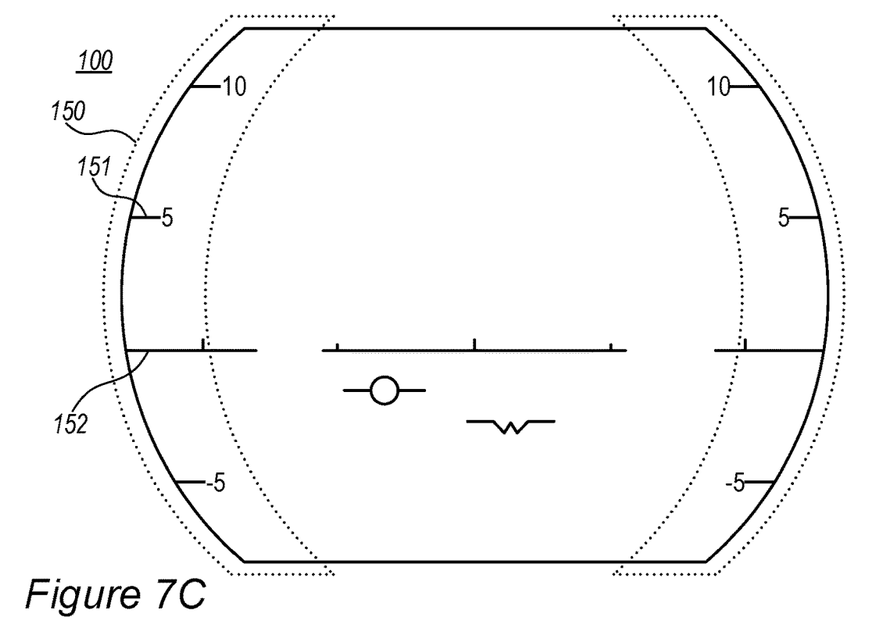
Figure 7D:
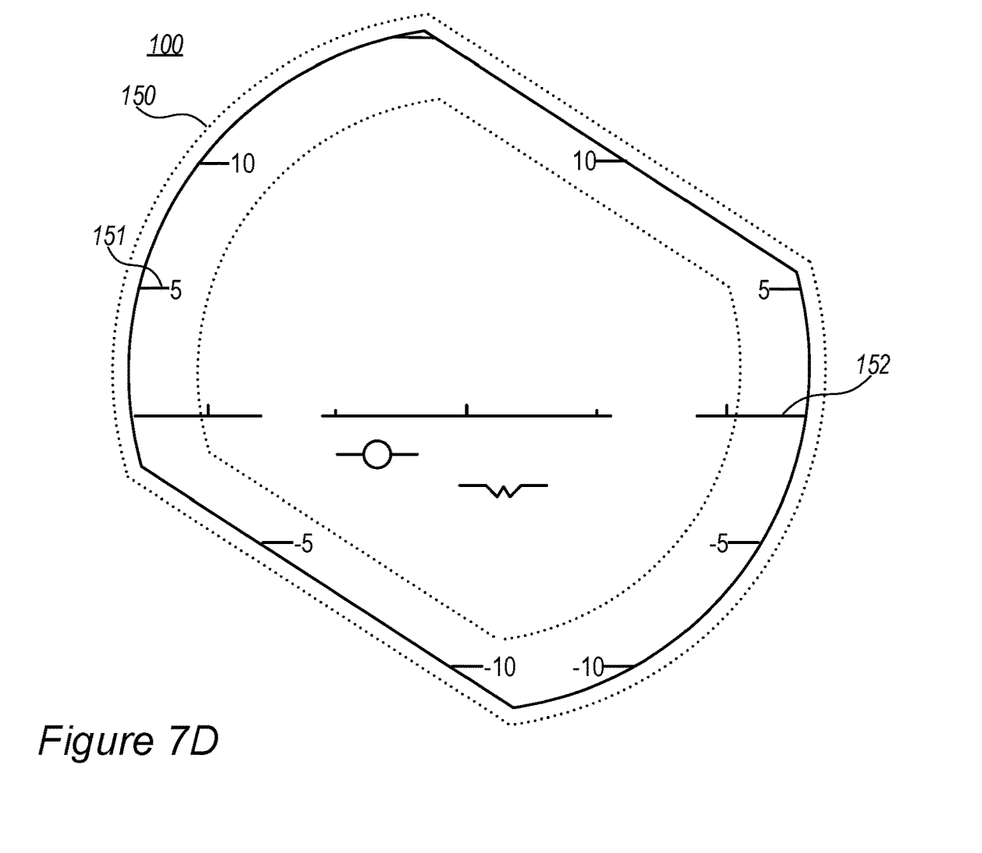

FIGS. 7A-7D are high level schematic illustrations of peripheral pilot-scene pitch indication region 150, according to some embodiments of the invention. FIGS. 7A, 7B provide a schematic illustration with crude indication of peripheral pilot-scene pitch indication region 150, while FIGS. 7C, 7D provide more realistic examples of peripheral pilot-scene pitch indication region 150, in horizontal and inclined orientations, respectively. Peripheral pilot-scene pitch indication region 150 may be implemented, e.g., by processing unit 102 on any type of head and/or instrument mounted display, such as see-through display 100, head up displays and/or displays associated with sensing or actuation instruments (e.g., imagers, pointers, etc.). Processing unit 102 may be configured to indicate scene orientation information according to an orientation of the pilot's head with respect to the scene. For example, the scene orientation information may comprise a horizon line 152 (which may extend beyond region 150) and indications 151 at a periphery of the display which correspond to multiple pitch lines (e.g., in the illustrated non-limiting example, −5°, −10°, −15°) in the scene.

In certain embodiments, see-through display 100 may be associated with a payload such as an imaging unit, and be configured to display information and data to the payload. Specifically, peripheral pitch indication region 150 and processing unit 102 may be configured to indicate scene orientation information according to an orientation of the payload with respect to the scene.

While in prior art head down displays no information concerning the relative orientation of the pilot and the scene is provided, and while in some mounted displays central indication of the relative orientation of the pilot and the scene is provided within or in proximity to the pitch ladder display region 94, at a central location on the display (see e.g., FIG. 2, in which the pitch ladder is displayed in the top center of display 90)—pilot-scene pitch indication region 150 indicates the relative orientation of the pilot and the scene at the periphery of see-through display 100 to provide the pilot with more intuitive display of the relative orientation of the pilot's head and the scene and with pilot-scene pitch indication region 150 which does not obstruct the crowded central area of display 100 and utilizes relative free regions 150 thereof. Peripheral pilot-scene pitch indication region 150 may comprise indications 151, 152 of the orientation of the pilot's head with respect to the external scene.

For example, as illustrated in FIGS. 7A-7D, pitch lines may be presented to quantify outer scene objects and conformal elements with respect to the orientation of the pilot's head. A set of pitch lines 151 and horizon line 152 may be presented on display 100 at region 150 to quantify the angular position of conformal symbols, synthetic vision system (SVS) elements, enhanced vision system (EVS) elements and outer world objects. For example, using peripheral pilot-scene pitch indication region 150, the pilot may quantify the exact angle of approach needed for landing by observing the landing pads and their orientation with respect to indications 151, 152 on peripheral pilot-scene pitch indication region 150, looking through display 100.

Figure 8A:
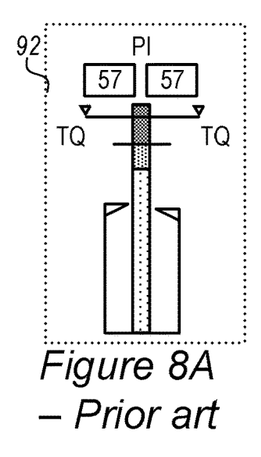
Figure 8B:
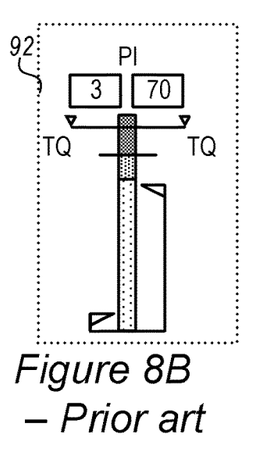
Figure 8C:
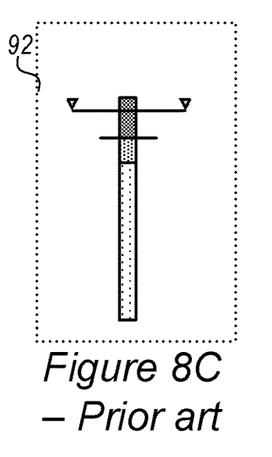
Figure 8D:
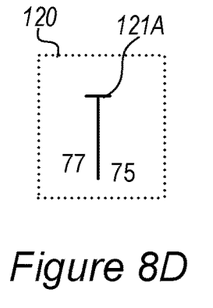
FIGS. 8D-8K are high level schematic illustrations of a power state indication region according to some embodiments of the invention, with respect to FIGS. 8A-8C illustrating prior art display regions.
Figure 8E:
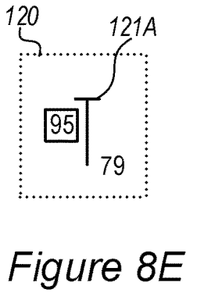
Figure 8F:
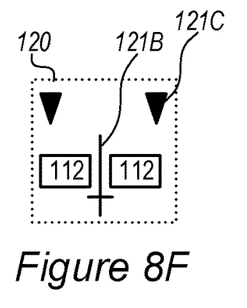
Figure 8G:
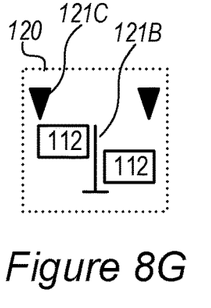
Figure 8H:
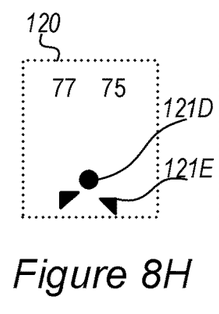
Figures 8I, 8J:
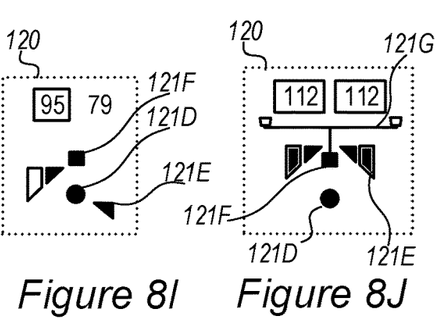
Figure 8K:
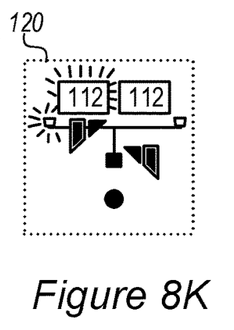

FIGS. 8D-8K are high level schematic illustrations of power state indication region 120 according to some embodiments of the invention, with respect to FIGS. 8A-8C illustrating prior art display regions 92. For example, FIGS. 8D-8G illustrate schematically some embodiments of power state indication region 120 showing typical displays of cases when the engine is in regular operation (FIG. 8D), when the engine approaches a limit defined for regular operation (FIG. 8E), when the engine approaches is beyond the region defined for regular operation (FIG. 8F), and when the engine reaches a limiter value for engine operation (FIG. 8G), possibly corresponding to green (normal range), amber (cautionary range) and two red indications (limit and maximal limit of the approved operation range) of prior art display regions 92. The ranges may be coded in the behavior of power state indication region 120 with respect to transitions between the indicated states (FIGS. 8D-8G). For example, element 121A may comprise a scale configured to provide predefined limits to (FIG. 8D, e.g., maximal power for take-off or landing) and to change into element 121B once a predefined cautionary region is entered (FIG. 8F). Additional elements 121C may be displayed in such cases to indicate one or more predefined limits (FIGS. 8F, 8G). Indications concerning torque, ITT (interstage turbine temperature) and NG (compressor speed) may be provided with different (or no) labeling and engine disparity may be indicated by lowering the respective indication (e.g., FIGS. 8D, 8G). In another example, FIGS. 8H-8K illustrate schematically some embodiments of power state indication region 120 showing typical displays of cases when the engine is in regular operation (FIG. 8H), when the engine approaches a limit defined for regular operation (FIG. 8I), when the engine approaches is beyond the region defined for regular operation (FIG. 8J), and when the engine reaches a limiter value for engine operation (FIG. 8K), possibly corresponding to green (normal range), amber (cautionary range) and two red indications (limit and maximal limit of the approved operation range) of prior art display regions 92. The ranges may be coded in the behavior of power state indication region 120 with respect to transitions between the indicated states (FIGS. 8H-8K). For example, element 121D may be configured to indicate a limit for regular operation (FIG. 8H), element 121F may be configured to indicate a limit for cautionary operation (FIG. 8I) and element 121G may be configured to indicate a maximal limit for approved operation (FIG. 8J), while elements 121E may be configured to indicate the state of the engines in position, shape and/or behavior such as the extent of movements with respect to the engine operation (e.g., move within a specified range only, with numeral indication only provided above certain limits).

Embodiments such as presented in FIGS. 4 and 8D-8K are advantageous with respect to the prior art, e.g., as illustrated schematically in FIGS. 8A-8C, with respect to the size of display region 120 with respect to prior art display region 92, with respect to the relevance of the presented data to the situation at hand and with respect to the ability to alert the pilot in realtime as emergencies develop. As illustrated in FIGS. 8A-8C, prior art display region 92 has the same area all the time, and the relation between the indications and the operation conditions is indicated mainly by the position of the dials with respect to the colored region, which is a fine detail in the overall display. In contrast, disclosed power state indication region 120 has a minimal area when operation is normal and increases the extent of the indications as the situation becomes more severe, to attract the pilot's attention and provide only the information required for quick decision making. The content displayed in power state indication region 120 is dynamic and related to the severity of the situation.

Figure 9:
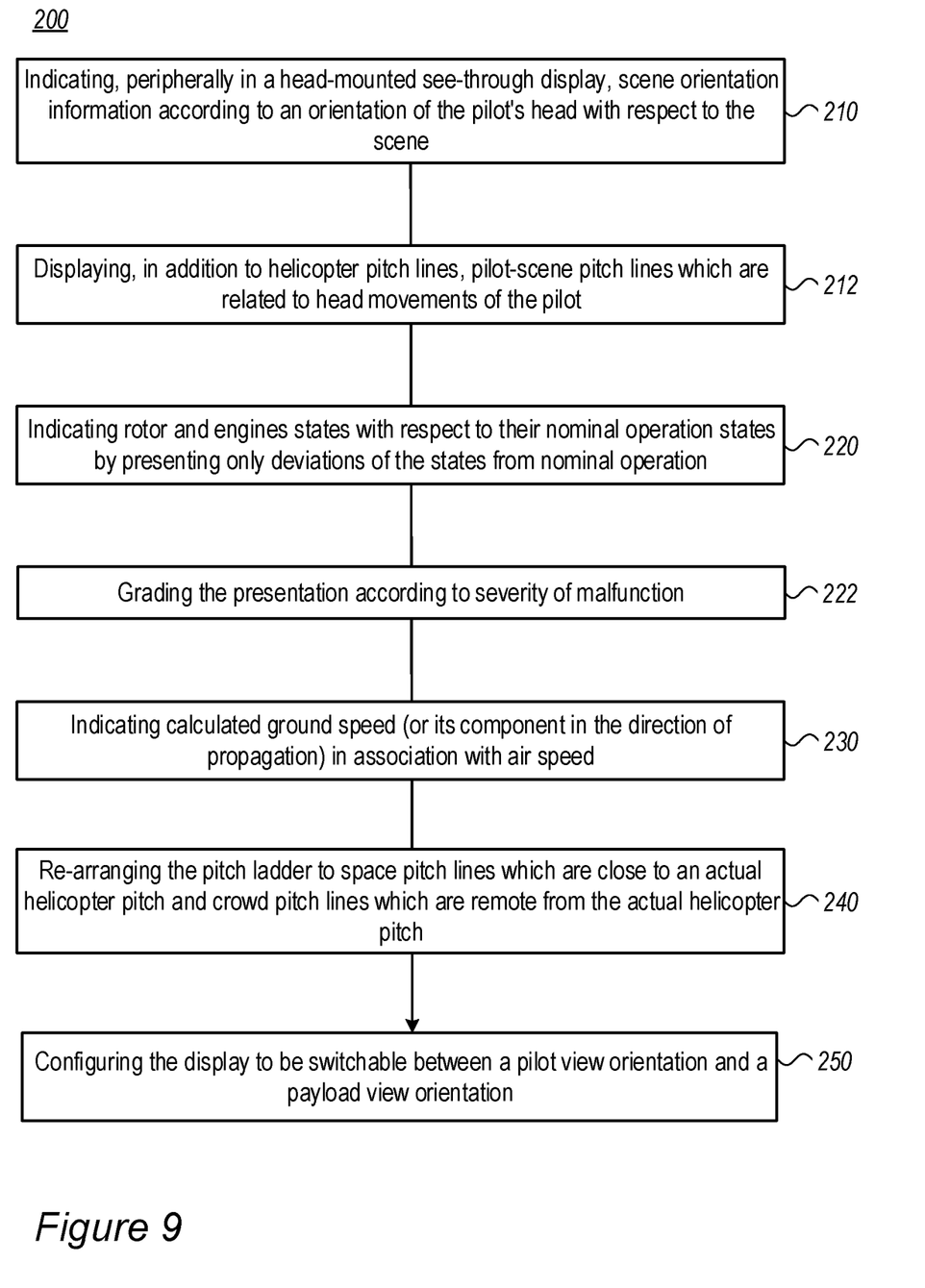
FIG. 9 is a high level flowchart illustrating a method, according to some embodiments of the invention.

FIG. 9 is a high level flowchart illustrating a method 200, according to some embodiments of the invention. The method stages may be carried out with respect to see-through display 100 described above, which may optionally be configured to implement method 200. Method 200 may be at least partially implemented by at least one computer processor. Certain embodiments comprise computer program products comprising a computer readable storage medium having computer readable program embodied therewith and configured to carry out of the relevant stages of method 200. Method 200 may comprise stages for configuring and operating see-through display 100, such as any of the following stages, irrespective of their order.

Method 200 comprises indicating, peripherally in a head-mounted see-through display, scene orientation information according to an orientation of the pilot's head with respect to the scene (stage 210). Method 200 may further comprise processing the scene orientation information from the orientation of the pilot's head with respect to the scene by at least one computer processor. For example, method 200 may comprise displaying, in addition to helicopter pitch lines, pilot-scene pitch lines which are related to head movements of the pilot (stage 212). The pilot-scene pitch lines may be presented peripherally on the see-through display, possibly showing only circumferential line edges of the pilot-scene pitch lines to provide intuitive orientation cues and enable relating the orientation of scene elements with objects associated with the pilot, such as parts of the helicopter and instrumentation mounted thereupon.

Method 200 may further comprise indicating rotor and engines states with respect to their nominal operation states by presenting only deviations of the rotor and engines states from their nominal operation states (stage 220). Method 200 may further comprise processing the deviations of the rotor and engines states from their nominal operation states and the corresponding indications by at least one computer processor. Method 200 may further comprise grading the presentation according to a severity of malfunction of the rotor and engines (stage 222). For example, the severity of malfunction may be graded and correspondingly indicated, e.g., into type(s) requiring immediate pilot reaction and type(s) which do not require immediate control input from the pilot.

Method 200 may further comprise indicating, in association with displayed air speed, a calculated ground speed or a calculated ground speed component in a direction of propagation (stage 230) and possibly calculating the ground speed or the calculated ground speed component in a direction of propagation by at least one computer processor.

Method 200 may further comprise re-arranging a displayed pitch ladder to space close pitch lines and crowd remote pitch lines (stage 240), e.g., by using a cylindrical projection of the pitch ladder and/or by enable user adjustment of the spacing between steps of the pitch ladder, namely between the pitch reference lines. Method 200 may further comprise configuring the display to be switchable between a pilot view orientation and a payload view orientation (stage 250), as disclosed above.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A head-mounted see-through display comprising a peripheral pilot-scene pitch indication region,
   wherein the head-mounted see-through display is associated with a processing unit configured to indicate, in the peripheral pilot-scene pitch indication region on the head-mounted see-through display, scene orientation information according to an orientation of a pilot's head with respect to the scene,
   wherein the scene orientation information is conformal with respect to the orientation the pilot's head,
   wherein the scene orientation information comprises a horizon line which extends through and beyond the peripheral pilot-scene pitch indication region, and
   wherein the scene orientation information further comprises a plurality of indications in the peripheral pilot-scene pitch indication region which correspond to pitch lines.

2. The head-mounted see-through display of claim 1, further configured to be switchable to display a payload view orientation in addition to a pilot view orientation.

3. The head-mounted see-through display of claim 1, further comprising the processing unit.

4. The head-mounted see-through display of claim 1, further comprising a propulsion state indication region, wherein the processing unit is further configured to indicate rotor and engines states with respect to their nominal operation states by presenting only deviations of the rotor and engines states from their nominal operation states.

5. The head-mounted see-through display of claim 4, wherein the processing unit is further configured to indicate normal rotor and engines states by a designated symbol.

6. The head-mounted see-through display of claim 4, wherein the processing unit is further configured to grade the presentation according to a severity of malfunction of the rotor and at least one engine.

7. The head-mounted see-through display of claim 1, further comprising a speed indication region, wherein the processing unit is further configured to indicate, in association with displayed air speed, a calculated ground speed or a calculated ground speed component in a direction of flight.

8. The head-mounted see-through display of claim 1, further comprising a helicopter pitch indication region displaying a pitch ladder which is re-arranged to space pitch lines which are close to an actual helicopter pitch and to crowd pitch lines which are remote from the actual helicopter pitch.

9. The head-mounted see-through display of claim 8, wherein the pitch ladder rearrangement comprises a cylindrical projection thereof.

10. A method comprising indicating, in a peripheral pilot-scene pitch indication region on a head-mounted see-through display, scene orientation information according to an orientation of a pilot's head with respect to the scene,
    wherein the scene orientation information is conformal with respect to the orientation the pilot's head,
    wherein the scene orientation information comprises a horizon line which extends through and beyond the peripheral pilot-scene pitch indication region, and
    wherein the scene orientation information further comprises a plurality of indications in the peripheral pilot-scene pitch indication region which correspond to pitch lines.

11. The method of claim 10, further comprising processing the scene orientation information from the orientation of the pilot's head with respect to the scene by at least one computer processor.

12. The method of claim 10, further comprising indicating rotor and engines states with respect to their nominal operation states by presenting only deviations of the rotor and engines states from their nominal operation states.

13. The method of claim 12, further comprising processing the deviations of the rotor and engines states from their nominal operation states and the corresponding indications by at least one computer processor.

14. The method of claim 12, further comprising grading the presentation according to a severity of malfunction of the rotor and engines.

15. The method of claim 10, further comprising indicating, in association with displayed air speed, a calculated ground speed or a calculated ground speed component in a direction of flight.

16. The method of claim 15, further comprising calculating the ground speed or the calculated ground speed component in the direction of flight by at least one computer processor.

17. The method of claim 10, further comprising re-arranging a displayed pitch ladder to space close pitch lines and crowd remote pitch lines.

18. A head-mounted display associated with a payload and comprising a peripheral unit-scene pitch indication region,
    wherein the head-mounted display is associated with a processing unit configured to indicate, in the peripheral unit-scene pitch indication region on the head-mounted display, scene orientation information according to an orientation of the payload with respect to a scene,
    wherein the scene orientation information is conformal with respect to the orientation the payload, and wherein the scene orientation information comprises a horizon line which extends through and beyond the peripheral unit-scene pitch indication region, and wherein the scene orientation information further comprises a plurality of indications in the peripheral unit-scene pitch indication region which correspond to pitch lines.

* * * * *